United States Patent Office 3,809,601
Patented May 7, 1974

3,809,601
BONDED JOINT AND METHOD
James C. Fletcher, Administrator of the National Aeronautics and Space Administration, with respect to an invention of John B. Sainsbury-Carter, Newtown, Conn.
Filed Sept. 18, 1972, Ser. No. 290,021
Int. Cl. B32b 3/02, 3/10
U.S. Cl. 161—116
18 Claims

ABSTRACT OF THE DISCLOSURE

An improved joint for reducing the peak shear stress in adhesive bonds when adhesives are used to bond two materials which are in a lapped relationship and which differ in value of modulus of elasticity. An insert placed between the adhesive and one of the two materials acts to cushion the discontinuity of material stiffness thereby reducing the peak shear stress in the adhesive bond.

ORIGIN OF THE INVENTION

Figure 1:
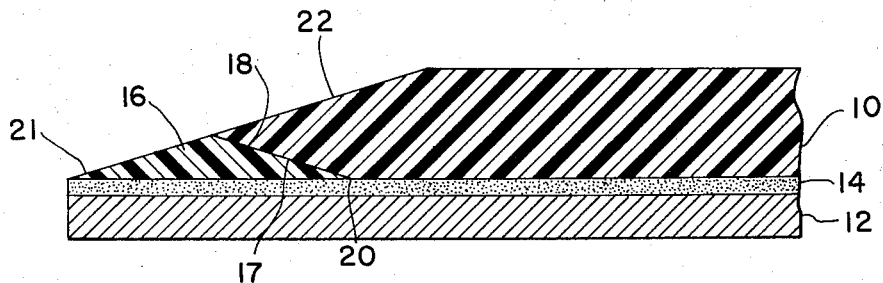
Figure 2:
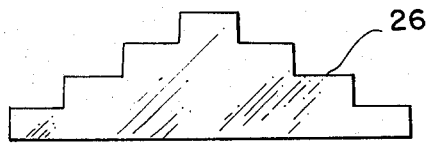
Figure 3:
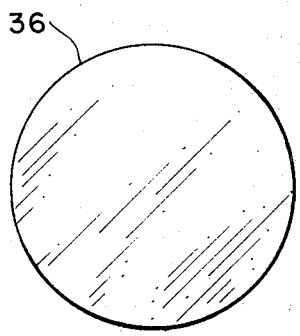
Figure 4:
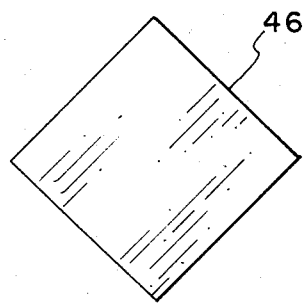
Figure 5:
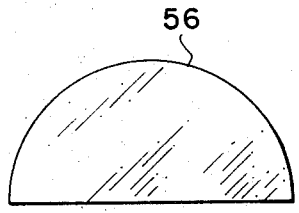

The invention described herein was made in the performance of work under a NASA contract and is subject to the provisions of Section 305 of the National Aeronautics and Space Act of 1958, Public Law 85–568 (72 Stat. 435; 42 U.S.C. 2457).

BACKGROUND OF THE INVENTION

The invention relates generally to adhesive bonding and more specifically involves the reduction of the peak shear stress in an adhesive joint when an adhesive is used to bond two materials which are in a lapped relationship and which have diverse stiffness values or moduli of elasticity.

Previously, whenever an adhesive was used to bond two materials of diverse stiffness, the adhesive bond would be subjected to a high peak shear stress located at the lap joint end of the stiffer material. Peak shear stress above acceptable limits causes shortened bond life, weak bonding and delamination of the adhesive bonds. One prior art solution to this problem has involved tapering the stiffer material of the bond joint at the end nearest the lap joint. Tapering this end reduces the discontinuity of stiffness values between the two bonded materials thereby reducing the peak shear stress in the adhesive bond. Limitations of the prior art concern the minimum thickness that can be achieved in the tapered material. For example, when fibrous composite materials are bonded, the minimum thickness taper is often inadequate to reduce the peak shear stress in the adhesive bond to an acceptable level. Therefore, there is a definite need in the art for an improved adhesive bonded joint for connecting materials having diverse stiffness characteristics.

Accordingly, it is an object of the present invention to provide an improved joint for reducing the peak shear stress in an adhesive bond when two materials having diverse stiffness values or moduli of elasticity are bonded by an adhesive.

Another object of the present invention is a method for reducing the peak shear stress in an adhesive bond when two materials having diverse stiffness values or moduli of elasticity are bonded by an adhesive.

BRIEF DESCRIPTION OF THE DISCLOSURE

The foregoing and other objects are attainable in the present invention by providing an undercut surface in the end face of one of the materials to be joined by the adhesive bond. An insert is then positioned to fit snugly within this undercut surface with a portion thereof extending beyond the material having the undercut surface therein. At least one surface of the insert engages an adhesive layer.

When an adhesive bonds two materials having diverse stiffness values or moduli of elasticity, a high peak shear stress is induced in the adhesive bond.

Use of this insert provides a graduating effect between the two bonded materials and thereby reduces the sharp discontinuity of stiffness between the two bonded materials which, in turn, reduce the peak shear stress in the adhesive bond to an acceptable level.

A more complete appreciation of the present invention and many more of the attendant advantages thereof will be readily appreciated as the same becomes better understood by reference to the following detailed description when considered in connection with the accompanying drawing wherein:

FIG. 1 shows a cross sectional view of the novel bonded joint of the present invention.

FIGS. 2, 3, 4, and 5 show various insert modification forms useful in the present invention.

DETAILED DESCRIPTION OF THE INVENTION

Referring now to the embodiment of the invention selected for illustration in FIG. 1, the relationship of the various elements comprising the adhesive bond utilized in the present invention will now be described.

Two materials 10 and 12 having diverse stiffness values or moduli of elasticity are bonded by an adhesive layer 14 therebetween. Insert 16 formed of a material having a stiffness value which does not exceed that of either materials 10 or 12 is positioned between material 10 and adhesive layer 14. One side 17 of insert 16 fits snugly into preformed angular undercut 18 formed in material 10 at the lap joint 20. The base 19 of insert 16 is in parallel engagement with adhesive layer 14 and the other side 21 of insert 16 extends beyond material 10 such that, together with the tapered surface 22 of material 10, a planar surface is formed.

In a specific example of the invention, material 10 is formed of essentially 50% boron and 50% epoxy by volume; material 12 is 7075–T6 aluminum alloy; adhesive layer 14 is AF 126–2, a trade name epoxy adhesive manufactured by Minnesota Minning and Manufacturing Company of St. Paul, Minn.; and insert 16 is formed of essentially 60% fiber glass and 40% epoxy by volume.

In this specific example, the boron/epoxy had the highest modulus of elasticity, the aluminum had the next highest modulus of elasticity and the fiber glass/epoxy has the lowest modulus of elasticity.

The composition of insert 16 is not considered critical in any embodiment of the present invention so long as the modulus of elasticity thereof does not equal or exceed that of the stiffest material of the lap joint. In the operation of this invention, insert 16 provides a cushion or a soft spot between the two bonded materials 10 and 12 and in effect acts to spread bond deformation over a larger area and thus reduces the peak shear stress in the adhesive bond.

Referring now to FIGS. 2, 3, 4, and 5 various modifications that can be taken for the insert are illustrated and distinguished, respectively, by reference numerals 26, 36, 46, 56 wherein 26 is an insert with essentially a stepped triangular cross-section; 36 is an insert having a circular cross-section; 46 is an insert with a diamond cross-section, and 56 is an insert having a semi-circular cross-section.

It is to be understood that the forms of the invention shown and described herein are to be taken as preferred embodiments only, and that the invention may be practiced otherwise than as specifically described. For example, although various apparent modifications of the insert form have been illustrated the invention is not so limited and other features of the invention will be readily apparent to those skilled in the art without departing from the spirit and scope of the appended claims.

What is claimed as new and desired to be secured by Letters Patent of the United States is:

1. An improved joint for reducing the peak shear stress in an adhesive bond when an adhesive is used to join two materials in lapped relationship and which materials have diverse stiffness values or moduli of elasticity, comprising:
    first and second materials having diverse stiffness properties, an adhesive layer for bonding the first and second materials, in an overlapping relationship,
    an insert formed of a third material,
    an undercut surface formed in the end face of one of the first and second materials at the lap joint formed therebetween,
    said undercut corresponding in shape to and adapted to receive a portion of said insert therein,
    said insert when so positioned in said undercut having a portion thereof in parallel engagement with the adhesive layer, and another portion thereof extending beyond the material having the undercut surface therein,
    said insert thereby providing a cushioning effect between the two bonded materials and thereby reducing the peak shear stress induced in the adhesive.

2. An improved joint as in claim 1 wherein said undercut surface is angular with respect to the adhesive layer and said insert is provided with essentially a triangular cross-sectional area.

3. An improved joint as in claim 2 wherein one side of said insert is adapted to snugly engage said angular undercut surface.

4. An improved joint as in claim 3 wherein an angular tapered face is formed on the said material having the undercut therein and the other side of said triangular insert forms a continuous surface with said angular tapered face when said triangular insert is positioned within said undercut surface.

5. An improved joint for reducing the peak shear stress in an adhesive bond when an adhesive is used to join two materials in a lapped relationship and which materials have stiffness values or moduli of elasticity, comprising:
    first and second materials having diverse stiffness properties,
    an adhesive layer for bonding said first and second materials in an overlapping relationship,
    an insert formed of a third material that has a stiffness value which does not exceed that of said first and second materials,
    an undercut surface formed in the face of one of said first and second materials at the lap joint formed therebetween,
    said undercut corresponding in shape to and adapted to receive a portion of said insert therein,
    said insert when so positioned in said undercut being in parallel engagement with the adhesive layer and thereby providing a cushioning effect between the two bonded materials and reducing the peak shear stress induced in the adhesive.

6. An improved joint as in claim 5 wherein said undercut surface is formed in the face of the material having the highest stiffness value used in the bond.

7. An improved joint as in claim 5 wherein the cross-sectional area of said insert is triangular in form.

8. An improved joint as in claim 5 wherein the cross-sectional area of said insert is semicircular in form.

9. An improved joint as in claim 5 wherein the cross-sectional area of said insert is polygonal in form.

10. An improved joint as in claim 5 wherein the cross-sectional area of said insert is circular in form.

11. An improved joint as in claim 5 wherein at least one surface area of said insert is of stepped configuration.

12. An improved joint as in claim 5 wherein the bonded material having the highest modulus of elasticity is boron/epoxy.

13. An improved joint as in claim 5 wherein the bonded material having the next highest modulus of elasticity is aluminum.

14. An improved joint as in claim 5 wherein the bonded material having the lowest modulus of elasticity is fiber glass/epoxy.

15. A method for reducing the peak shear stress in an adhesive joint used to bond two materials having diverse stiffness values or moduli of elasticity, comprising the steps of:
    providing first and second materials to be bonded,
    providing an adhesive layer therebetween,
    providing an insert made from a material whose modulus of elasticity value does not equal or exceed the higher modulus of elasticity value of the two bonded materials,
    making an undercut surface in the stiffer of the two materials in the joint at the end thereof where the peak shear stress in the adhesive bond occurs, and
    positioning said insert in said undercut surface such that a portion thereof is in parallel engagement with the adhesive and such that another portion thereof extends beyond the end of said material having the undercut surface formed therein.

16. Securing said insert into position permanently by means of the adhesive bonding material so that said insert provides a cushioning effect between the two bonded materials and thereby reduces the peak shear stress induced in the adhesive bond.

17. The method of claim 15 wherein the material having the highest modulus of elasticity is essentially 50% boron and 50% epoxy by volume, the material having the next highest modulus of elasticity is 7075–T6 aluminum and the material having the lowest modulus of elasticity is essentially 60% fiber glass and 40% epoxy by volume.

18. The method of claim 15 wherein adhesive layer is an epoxy adhesive.

References Cited

UNITED STATES PATENTS

| | | | |
|---|---|---|---|
| 2,751,321 | 6/1956 | Sans | 161—254 |
| 3,231,450 | 1/1966 | Riel | 156—309 |
| 3,545,795 | 12/1970 | Hertel | 161—38 |
| 3,723,214 | 3/1973 | Meraz, Jr. | 161—213 |

OTHER REFERENCES

Economy, High Performance Composites, Chemical Engineering Progress, October 1969 (vol. 65, No. 10), pp. 46–49.

WILLIAM J. VAN BALEN, Primary Examiner

S. S. SILVERMAN, Assistant Examiner

U.S. Cl. X.R.

156—250, 293, 303.1, 309; 161—38, 39, 118, 145, 149